(12) United States Patent
Toko

(10) Patent No.: US 8,294,849 B2
(45) Date of Patent: Oct. 23, 2012

(54) LIQUID CRYSTAL DISPLAY DEVICE CAPABLE OF LOW TEMPERATURE USE AND HAVING ROD-SHAPED GOLD PARTICLES OF NANOMETER ORDER DISPERSED IN THE LIQUID CRYSTAL LAYER

(75) Inventor: Yasuo Toko, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 12/131,317

(22) Filed: Jun. 2, 2008

(65) Prior Publication Data

US 2008/0303984 A1 Dec. 11, 2008

(30) Foreign Application Priority Data

Jun. 6, 2007 (JP) .................................. 2007-150124
Dec. 25, 2007 (JP) .................................. 2007-332293

(51) Int. Cl.
*G02F 1/133* (2006.01)
*C09K 19/52* (2006.01)

(52) U.S. Cl. .......................................... 349/72; 349/163
(58) Field of Classification Search .................... 349/72, 349/163–166
See application file for complete search history.

(56) References Cited

U.S. PATENT DOCUMENTS 5,597,626 A * 1/1997 Eguchi ............................ 428/1.4
5,639,398 A * 6/1997 Rhee et al. ................ 252/299.01
2005/0218377 A1 * 10/2005 Lawandy .................. 252/299.01
2006/0266157 A1 * 11/2006 Takata et al. ..................... 75/255
2011/0230568 A1 * 9/2011 Hoare et al. ................. 514/772.3

FOREIGN PATENT DOCUMENTS

CN 1979267 A 6/2007
JP 63-259623 A 10/1988

(Continued)

OTHER PUBLICATIONS

Norman, Thaddeus J. et al., "Near Infrared Optical Absorption of Gold Nanoparticle Aggregates," J. Phys. Chem. B, 2002, 106 (28), pp. 7005-7012.*
Chinese Office Action dated Mar. 9, 2011 (and English translation thereof) in counterpart Chinese Application No. 200810108926.7.
Japanese Office Action dated Nov. 29, 2011 (and English translation thereof) in counterpart Japanese Application No. 2007-150124.
Japanese Office Action dated Jun. 26, 2012 (and English translation thereof) in counterpart Japanese Application No. 2007-332293.

*Primary Examiner* — Mark Robinson
*Assistant Examiner* — Paul Lee
(74) *Attorney, Agent, or Firm* — Holtz, Holtz, Goodman & Chick, PC

(57) ABSTRACT

A liquid crystal display device comprises: a liquid crystal display element comprising a pair of glass substrates facing to each other, transparent electrode patterns, each transparent electrode pattern being formed on a facing surface of each one of said pair of glass substrates film structures, each film structure including an oriented film and being formed on each one of said pair of glass substrates with covering said transparent electrode, and a liquid crystal layer held between the pair of glass substrates; and a light source that can radiate near infrared rays to said liquid crystal display element, and wherein at least one of said liquid crystal layer and said film structures include near infrared ray absorption material. A response time of the liquid crystal display device can be improved at a low temperature.

5 Claims, 11 Drawing Sheets

FOREIGN PATENT DOCUMENTS

| | | |
|---|---|---|
| JP | 8-297303 A | 11/1996 |
| JP | 2004-093841 A | 3/2004 |
| JP | 2005-024866 A | 1/2005 |
| JP | 2005018053 A * | 1/2005 |
| JP | 2005024866 A * | 1/2005 |
| JP | 2006-292970 A | 10/2006 |

* cited by examiner

FIG.5A

| LC4+Au (0.5wt%) (-20°C) | | IRRADIATION TIME (min) | | |
|---|---|---|---|---|
| | | 0 | 1 | 3 |
| RESPONCE TIME (msec) | RISE | 3918.8 | 3448.8 | 3479.9 |
| | DECAY | 3298.6 | 3095.1 | 3159 |
| | RISE+DECAY | 7217.4 | 6543.9 | 6638.9 |

FIG.5B

| LC4+Au (0.5wt%) (-30°C) | | IRRADIATION TIME (min) | | | |
|---|---|---|---|---|---|
| | | 0 | 1 | 3 | 5 |
| RESPONCE TIME (msec) | RISE | 17000 | 11499 | 11319 | 11319 |
| | DECAY | 14956 | 15380 | 16891 | 16037 |
| | RISE+DECAY | 31956 | 26878 | 28210 | 28912 |

| M4+Ag/Pd(0.1wt%) (-30°C) | | IRRADIATION TIME [min] | | | |
|---|---|---|---|---|---|
| | | 0 | 1 | 3 | 5 |
| RESPONCE TIME [msec] | RISE | 2579.3 | 2376 | 2284.6 | 1994.2 |
| | DECAY | 2150.2 | 1630.4 | 1798.3 | 1779.5 |
| | RISE+DECAY | 4729.5 | 4006.4 | 4082.9 | 3773.7 |

| M4+TI (0.1wt%) (−30°C) | | IRRADIATION TIME (min) | | | |
|---|---|---|---|---|---|
| | | 0 | 1 | 2 | 3 |
| RESPONCE TIME (msec) | RISE | 2825.9 | 2355.4 | 2328 | 2416.7 |
| | DECAY | 2104.3 | 2077.3 | 2078.6 | 1982.7 |
| | RISE+DECAY | 4930.2 | 4432.6 | 4406.7 | 4398.8 |

LIQUID CRYSTAL DISPLAY DEVICE CAPABLE OF LOW TEMPERATURE USE AND HAVING ROD-SHAPED GOLD PARTICLES OF NANOMETER ORDER DISPERSED IN THE LIQUID CRYSTAL LAYER

This application is based on Japanese Patent Application 2007-150124, filed on Jun. 6, 2007, and Japanese Patent Application 2007-332293, filed on Dec. 25, 2007, the entire contents of which are incorporated herein by reference.

BACKGROUND OF THE INVENTION

A) Field of the Invention

This invention relates to a liquid crystal display device, and more specifically to a liquid crystal display device suitable for usage at a low temperature.

B) Description of the Related Art

A response speed of a LCD becomes quite slow at a low temperature because viscosity of liquid crystals becomes higher. If the response speed is slow, blurring or ghost images may appear in a motion picture so that a display quality will be significantly lowered. Improvement of the response speed at a low temperature has been desired for a liquid crystal display used for a car-mounted device, an outdoor display board, a mobile phone, a mobile television set, etc. JPA 2000-93841 teaches a liquid crystal display device wherein a whole liquid crystal cell is heated by a plane heating source by equipping a panel heater on a glass substrate. Thermal efficiency is considered to be low because a liquid crystal layer is heated via the glass substrate and a polarizing filter. Therefore, it is difficult to utilize in a mobile phone, which has a limited power source.

JPA 2005-24866 teaches a crystal liquid display device wherein a liquid crystal layer is heated by irradiating emitted light of an infrared rays (IR) light emitting diode (LED) to a whole liquid crystal cell via a light guide. It is considered that irradiated infrared rays are mainly absorbed by a polarizing filter. Absorption of the infrared rays by the liquid crystal layer depends on an infrared ray absorption property of liquid crystal material. Thermal efficiency is considered to be low.

SUMMARY OF THE INVENTION

It is an object of the present invention to provide a liquid crystal display device with an improved response speed at a low temperature.

According to the present invention, there is provided a liquid crystal display device, comprising: a liquid crystal display element, comprising a pair of glass substrates facing to each other, transparent electrode patterns, each transparent electrode pattern being formed on a facing surface of each one of said pair of glass substrates, film structures, each film structure including an oriented film and being formed on each one of said pair of glass substrates with covering said transparent electrode, and a liquid crystal layer held between the pair of glass substrates; and a light source that can radiate near infrared rays to said liquid crystal display element, and wherein at least one of said liquid crystal layer and said film structures include near infrared ray absorption material.

According to the present invention, a response speed of a liquid crystal display device is improved at a low temperature.

BRIEF DESCRIPTION OF THE DRAWINGS

FIG. 5A and FIG. 5B are tables of response times of the sample S1 of the liquid crystal display element according to the first embodiment at −20 and −30 degrees Celsius with a radiation time of near infrared rays as a parameter.

DESCRIPTION OF THE PREFERRED EMBODIMENTS

Figure 1:
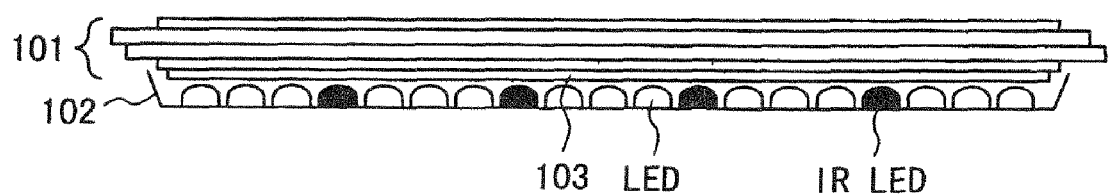
FIG. 1 is a schematic cross sectional view of a liquid crystal display device.

FIG. 1 is a schematic cross sectional view of a basic structure of a liquid crystal display device. The liquid crystal display device mainly consists of a liquid crystal display element 101 and a light unit 102. A case when the light unit is a back light is shown in the drawing. A light source of the light unit 102 consists of, for example, a visible light LED used for a back light of illumination and an infrared (IR) LED irradiating near infrared rays for heating A diffusion plate 103 is configured between the liquid crystal display element 101 and the light unit 102.

Normally, liquid crystals are placed between glass substrates in a LCD. A transmittance for infrared rays having about 3 μm wavelength or above is low. In the case of heating a liquid crystal layer with infrared rays, it is preferred that the infrared rays are not absorbed by the glass substrates but by the liquid crystal layer or a film near the liquid crystal layer, e.g., an oriented film or an insulating film.

The inventor of this invention thought of using infrared rays having wavelength of 3 μm or shorter than 3 μm in order to reduce absorption by glass substrates and adding material absorbing irradiated infrared rays to a liquid crystal layer or to a film near a liquid crystal layer. For example, metal particles are added to liquid crystals for absorbing infrared rays having wavelength of 3 μm or shorter by a liquid crystal layer to improve a response speed of a liquid crystal display device. Also, for example, material absorbing infrared rays is added to an oriented film, which is a film near a liquid crystal layer, or to a base film of an oriented film for absorbing infrared rays having wavelength of 3 μm or shorter by the film near a liquid crystal layer to improve a response speed of a liquid crystal display device.

The light unit 102 includes at least one type of an infrared ray emitting device. For example, as a near infrared ray emitting device, a LED having a light emitting layer of a GaAs group compound semiconductor, etc. and emitting 780 to 960 nm wavelength near infrared rays at an output power of 50 mW is used. By irradiating the near infrared rays, the near infrared rays transmitted through the glass substrate are absorbed by the liquid crystal layer or by the film near the liquid crystal layer so that the liquid crystal layer is heated by energy of the absorbed light.

(First Embodiment)

Figure 2:
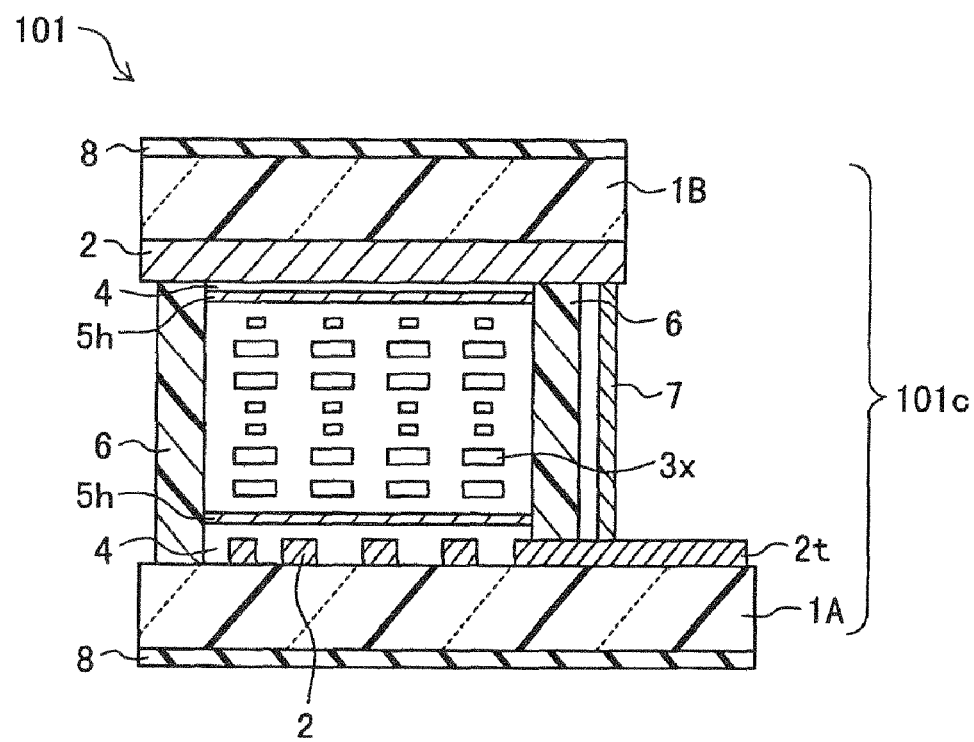
FIG. 2 is a cross sectional view of a liquid crystal display element according to a first embodiment of the present invention.

FIG. 2 shows a cross section of the liquid crystal display element 101 according to the first embodiment. A case of a positive yellow mode wherein a liquid crystal cell is a super twisted nematic (STN) liquid crystal cell will be described.

An indium tin oxide (ITO) film, which is a transparent film, is formed on each one of two glass substrates 1A and 1B by a CVD, vapor deposition or sputtering process, and the formed films are patterned to form desired ITO electrode patterns 2 and an output wiring 2*t* by a photolithography process. Insulating films 4 that cover the ITO electrode patterns 2 are formed on the glass substrates by flexo printing. The insulating films 4 are not indispensable but are preferably formed to prevent short-circuiting between the upper and lower substrates. The insulating films can be formed by a vapor deposition, sputtering or the likes with a metal mask other than the flexo printing.

Horizontally-orientate films 5*h* having almost same pattern as the insulating films are formed on the insulating films 4 by the flexo printing. In case of a STN-LCD, a pre-tilt angle (a degree of tilting liquid crystal molecules from a standard plane) is preferably 2 to 8 degrees. For example, the horizontally-oriented films 5*h* are obtained from Nissan Chemical Industries, LTD., and a rubbing process is performed to them. The rubbing process is a process in which the horizontally-oriented films 5*h* are rubbed by rapidly rolling a cylinder rolled with cloth. The process is performed to set a twist angle of liquid crystals 3*x* to 240 degree (left hand rotation).

A sealing material 6 is formed by a screen-printing with a predetermined pattern. The formation of the sealing material 6 can be performed by a dispenser instead of screen printing. For example, thermal hardening ES-7500, which can be obtained from Mitsui chemicals, Inc. may be used for the sealing material. An optical hardening, optical-thermal hardening type sealing material may also be used. Several percentages of glass fibers having a diameter of 6 μm are included in the sealing material 6.

Conducting material 7 is printed to a predetermined position. For example, material made of the sealing material ES-7500 including several percents of 6.5 μm Au-plated styrene balls is printed to a predetermined position as the conducting material 7.

The sealing material pattern 6 and the conducting material pattern 7 are formed only on the upper substrate 1B, and gap control material is dispersed by a dry dispersion process. The gap control material can be made of 6 μm plastic balls. Silica type micro-pearl may also be used.

The horizontally-orientated films 5*h* of the substrates 1A and 1B are placed on each other at a predetermined position to form a cell and are thermal-processed in a state of being pressed to harden the sealing material 6.

The glass substrates are scribed by a scriber and divided into vacant cells in a predetermined size and shape by breaking.

The liquid crystals 3*x* containing metal particles in nanometer order are filled to the vacant cell by a filling process using capillarity, and then a filling point are sealed by end-sealing material. After that, the glass substrate is chamfered and washed to form a liquid crystal cell 101*c*. In this specification, a structure without a polarizing filter is called a liquid crystal cell.

The liquid crystals, containing metal particles in nanometer order, to be filled will be explained. For example, an LC4 (birefringence Δn: 0.118, dielectric constant anisotropy Δ∈: 9.2), which is commonly used liquid crystal for STN and can be obtained from Dai Nippon Printing Co, Ltd., is used. Rod-shaped nanometers order gold (Au) particles in size of 10-20 nm short axis and 50-100 nm long axis can be obtained from Mitsubishi Materials Corporation. Liquid crystals LC4+Au containing nanometers order Au particles (hereinafter called the nm Au containing liquid crystals) are made by adding 0.5 wt % of those nanometers order Au particles to the liquid crystals LC4.

A sample S1 of a liquid crystal cell 101*c* using the nm Au containing liquid crystals (hereinafter called the nm Au containing liquid crystal cell 101*c*) was made. For comparison, a sample SC1 of a liquid crystal cell 101c to which the liquid crystals LC4 had been filled without nanometers order Au particles was also made. Transmittance of each one of the samples S1 and SC1 was measured.

Figure 3A:
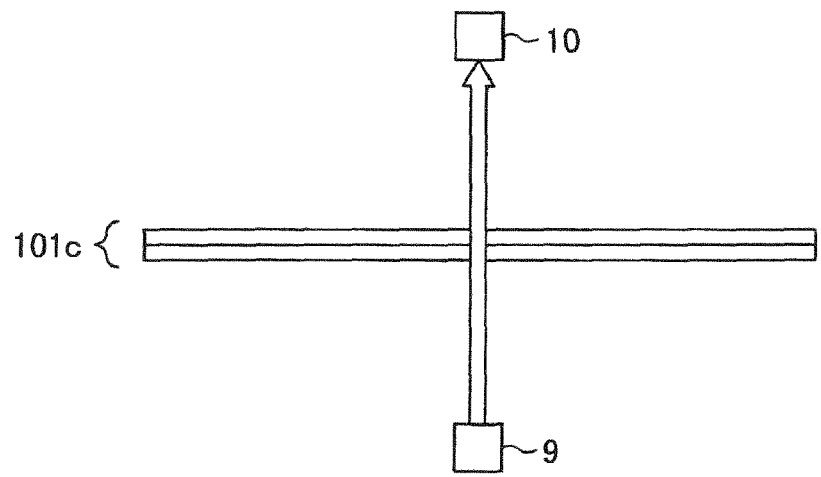
FIG. 3A and FIG. 3B are schematic views of measurement systems.

FIG. 3A shows a measurement system. An irradiating light from a light source 9 with a monochromator is detected by a detector 10. Light intensity when there is nothing placed between the light source 9 and the detector 10 is set to 100%. Relative light intensity is measured as transmittance (%) by the detector 10 detecting a transmitted light when no voltage is impressed under a condition that the liquid crystal cells 101*c* are placed between the light source 9 and the detector 10.

Figure 4:
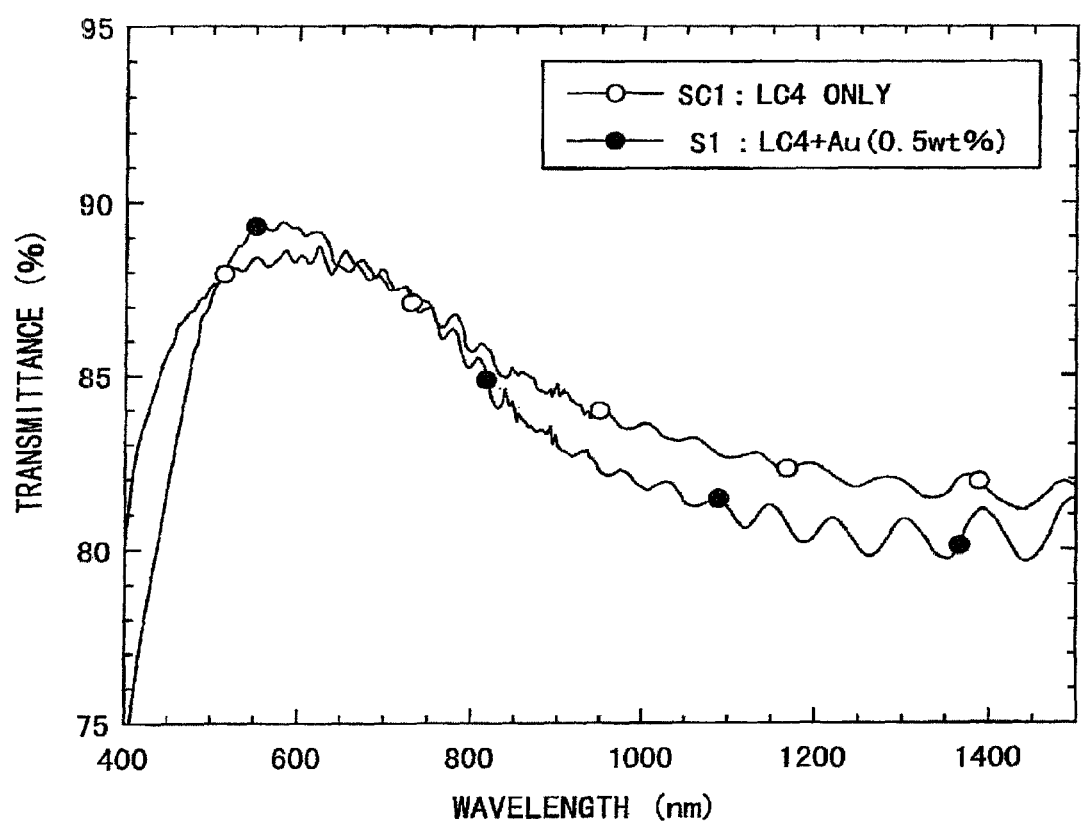
FIG. 4 is a graph showing a transmission spectrum of a sample S1 of a liquid crystal cell according to the first embodiment with comparison to a transmission spectrum of a sample SC1 of a comparative example.

FIG. 4 shows transmission spectrums of the samples S1 and SC1 from a visible range to a near infrared range. The transmittance in the near infrared range of the sample S1 to which the nanometers order Au particles are added is lower than that of the comparative sample SC1. From that, it is understood that the nm Au containing liquid crystals absorb near infrared rays. Paying attention to an yellow range because the first embodiment is the yellow mode, transmittance in the visible range at 780 nm or under of the sample S1 is not substantially different from that of the comparative sample SC1. From that, it can be considered that adding the nanometers order Au particles does not affect the transmittance of the liquid crystals in the yellow range.

The polarizing filters 8 are bonded to each liquid crystal cell 101*c* in crossed Nicols to manufacture a STN mode liquid crystal display element 101.

Response properties at low temperatures (−20 and −30 degrees Celsius) of the manufactured liquid crystal display elements 101 were measured under a condition of 1/64 duty drive at an optimized voltage.

Figure 3B:
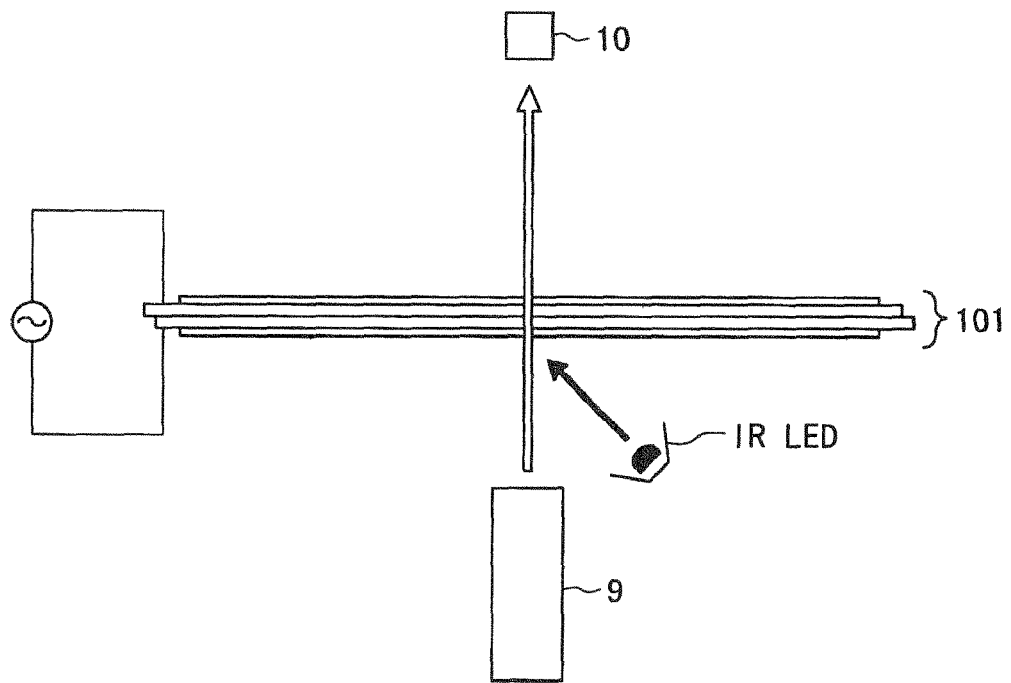

FIG. 3B shows a measurement system. LCD-5000 (Ohtsuka Electronics, Co., Ltd.) is used for the measurement. First, with impressing a voltage, a light emitted from the light source 9 and transmitted through the liquid crystal display elements 101 is measured by the detector 10 to measure voltage-contrast properties. Optimized voltage that can acquire the maximum contrast is obtained from the measured properties. The near infrared rays were irradiated to the liquid crystal display devices 101 from their back sides, and the response properties at the optimized voltage were measured at the low temperatures. An LED having 940 nm emitting wavelength and 50 mW output power was used for irradiating the near infrared rays. A distance between the cells and the LED was about 50 mm. the measurements of the responses were performed before the irradiation of the near infrared rays (irradiation time "0") and a minute, three minutes and five minutes after the irradiation, and after that the responses were compared.

FIG. 5A and FIG. 5B are tables showing response times at −20 and −30 degrees Celsius of the sample S1 of the liquid crystal display element to which the LC4+Au has been filled. In each table, the irradiation time represents time for irradiating the near infrared rays. The response times (Rise and Decay) depending on the irradiation times of the near infrared rays are compared. As shown in FIG. 5A and FIG. 5B, the liquid crystal display element using the liquid crystals LC4+Au has fast response times when the near infrared rays are irradiated with comparison to a case when the near infrared rays are not irradiated. The response times when the near infrared rays are irradiated for three and five minutes are not significantly different from case of irradiating for one minute, and the response times becomes at least about 8% faster than the case when the near infrared rays are not irradiated. Therefore, it can be said that the one minute irradiation is enough for acquire the effect of fastening the response time. The liquid crystal cells corresponding respectively to FIG. 5A and FIG. 5B were manufactured independently from each other, and optimization was not performed, therefore, the response times of both tables cannot be compared to each other. With the above-described results, it can be considered that the response time of the liquid crystals are shortened by adding the nanometers order Au particles to the liquid crystals because the nanometers order Au particles absorb the near infrared rays and energy of the absorbed near infrared rays becomes thermal energy to heat the liquid crystal layer.

(Second Embodiment)

Figure 6:
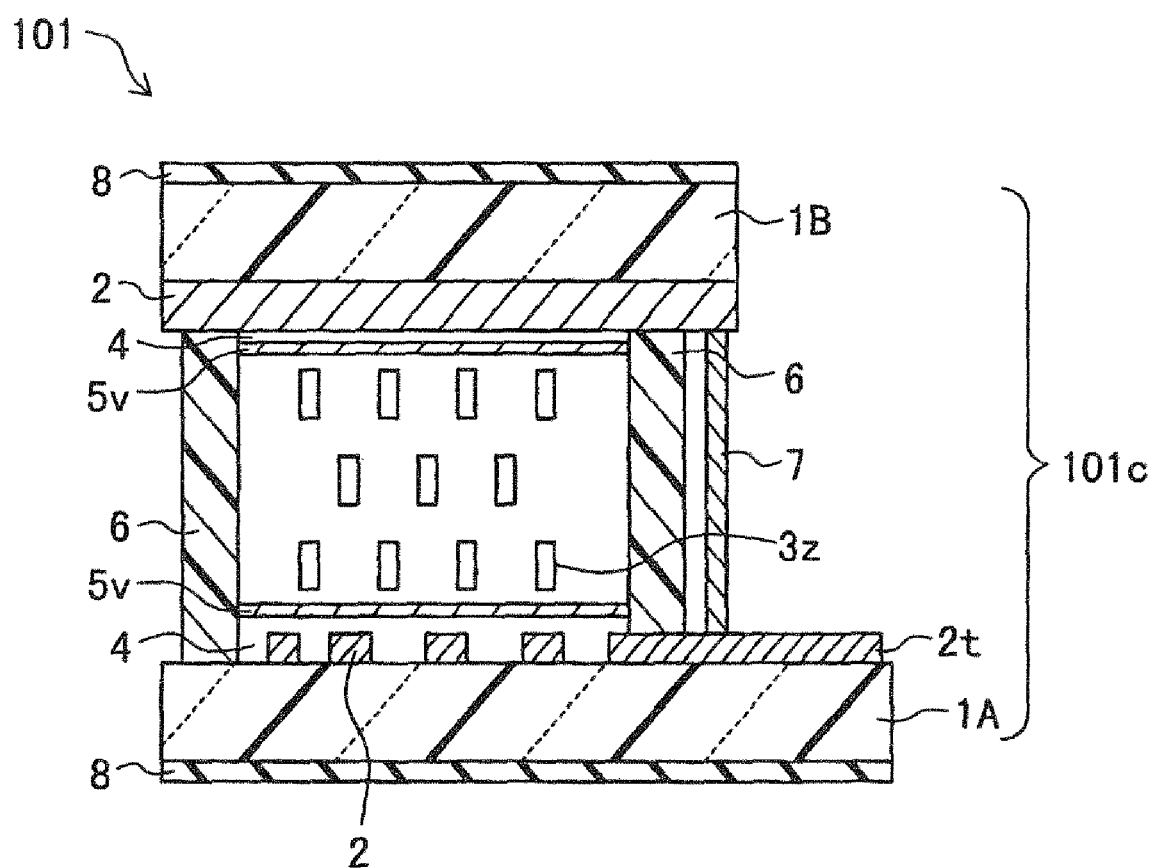
FIG. 6 is a cross sectional view of a liquid crystal display element according to a second embodiment of the present invention.

FIG. 6 shows a vertically-oriented type liquid crystal display element according the second embodiment of the present invention. Differences between the first and the second embodiment will be mainly explained. Vertically-oriented films 5v are formed on the insulating films 4. For the vertically-oriented films 5v, for example, SE-1211, which can be obtained from Nissan Chemical Industries, LTD. are used. The rubbing of the vertically-oriented films 5v are performed to make the upper and the lower substrate anti-parallel. A method disclosed in JPA 2005-234254 may be used for obtaining a uniformed mono-domain alignment. Further, a method for the alignment process to the oriented films is not limited to the rubbing process. Moreover, a photo-alignment method, an ion-beam alignment method, a plasma-beam alignment method, an oblique evaporation methods etc. can be used for an alignment process to the oriented films.

For example, LS-7500, which can be obtained from Mitsui chemicals, Inc., containing several percents of glass fibers having diameter of 3.9 μm can be used for the sealing material 6. The ES-7500 containing several percents of Au balls having a diameter of 4.4 μm can be used for the conducting material. For the gap control material, plastic balls having a diameter of 3.75 μm are used.

Vertically-orientated type liquid crystals 3z are filled into the liquid crystal cell. For example commonly used liquid crystals M4 (birefringence Δn: 0.094, dielectric constant anisotropy Δ∈: −3.3) for a vertically-orientated LCD, which ca be obtained from Merck Ltd., are used. Ag/Pd alloy particiles in nanometers order (hereinafter called the nm Ag/Pd alloy particiles), which are particiles of alloy of Ag and Pd in a size of 2 nm to 10 nm, can be obtained from Ubc Industries, Ltd. The liquid crystals M4 are added with 0.1 wt % of those nm Ag/Pd alloy particiles to make liquid crystals containing nm Ag/Pd alloy particiles M4+Ag/Pd for forming the vertically-oriented type liquid crystals 3z.

A sample S2 of the vertically-oriented liquid crystal cell was made by using the liquid crystals containing nm Ag/Pd alloy particiles M4+Ag/Pd. A comparative sample SC2 was made for comparison by filling the liquid crystals M4 without the nm Ag/Pd alloy particiles being added.

Figures 7, 8:
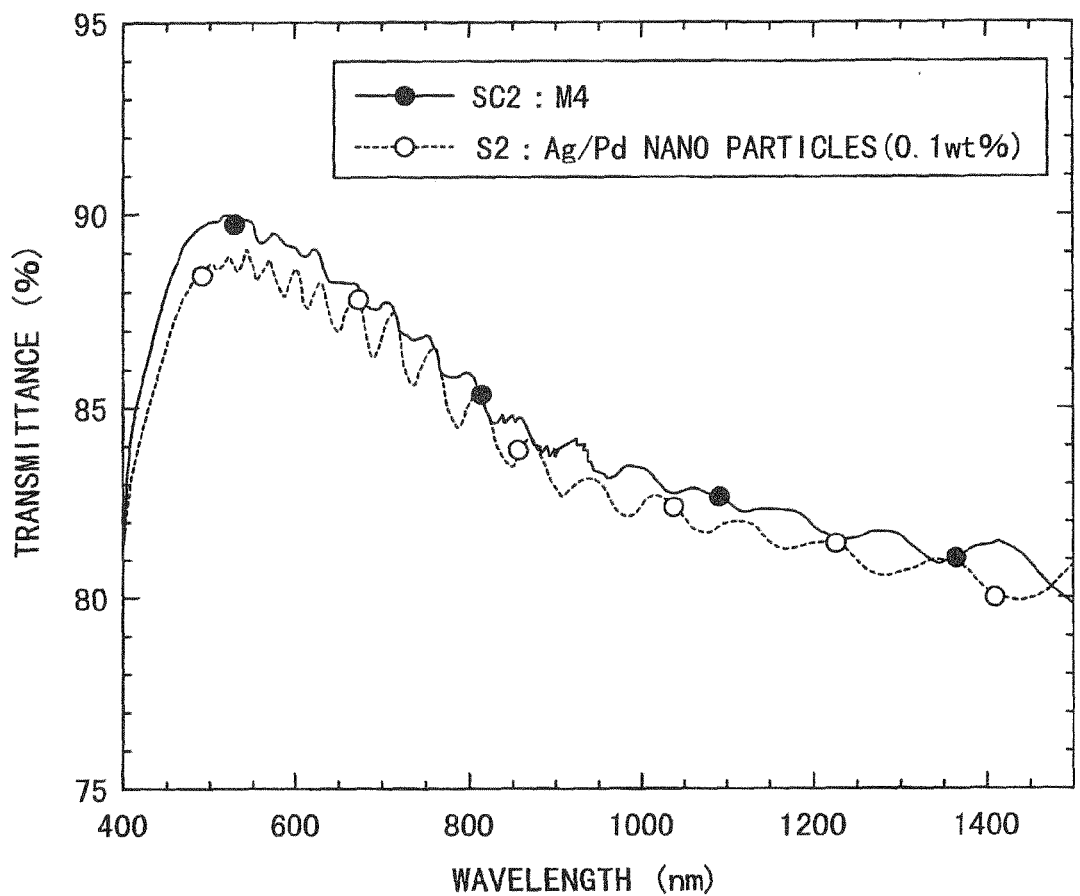
FIG. 7 is a graph showing a transmission spectrum of a sample S2 of a liquid crystal cell according to the second embodiment with comparison to a transmission spectrum of a sample SC2 of a comparative example.
FIG. 8 is a table of response times of the sample S2 of the liquid crystal display element according to the second embodiment at −30 degrees Celsius with a radiation time of near infrared rays as a parameter.

FIG. 7 shows transmission spectrums from the visible range to the near infrared range of the samples S2 and SC2 of the liquid crystal cells. The transmission spectrums were measured by the measurement system shown in FIG. 3A. As shown in the graph, the sample S2 of the liquid crystal cell to which the liquid crystals M4+Ag/Pd added with the nm Ag/Pd alloy particiles has lower transmittance in the near infrared range than the comparative sample SC2 does. The only difference between the sample S2 and the comparative sample SC2 is whether or not the nm Ag/Pd alloy particiles were added. It is understood that the nm Ag/Pd alloy particiles absorb light in the near infrared range.

In the visible range, the transmittance of the sample S2 and the comparative sample SC2 are almost same; therefore, it is understood that the liquid crystal cell to which the liquid crystals M4+Ag/Pd added with the nm Ag/Pd alloy particiles transmits almost same amount of light as the liquid crystal cell M4. Moreover, the reason why the transmission spectrum in FIG. 7 is waving is that there is interference depending on a thickness of the cells.

A normally-black-type vertically-oriented liquid crystal display element is manufactured by bonding polarizing filters on both upper and lower sides of the liquid crystal cell in crossed Nicols by rotating the filters at 45 degrees toward a direction of rubbing. A visual compensation plate may be attached to the polarizing filter.

Response property of the sample S2 of the liquid crystal display element at a low temperature (−30 degrees Celsius) was measured by the measurement system shown in FIG. 3B under a condition of ¼ duty drive at the optimized voltage.

FIG. 8 is a table showing response times of the sample S2 depending on irradiation time as a parameter. The LED for irradiating the near infrared rays is the same as in the first embodiment. From the table, it is understood that the response times are shortened at least about 14% by irradiating the near infrared rays. The response times are similar after the one minute irradiation and the three minutes irradiation. The response time after the five minutes irradiation is shorter than the one minute irradiation. The effect of shortening the response time can be acquired by adding the metal particles also in the vertically-oriented LCD.

(Other Examples for Nanometers Order Metal Particles to be Added)

Although all types of nanometers order metal particles can be used in the embodiments of the present invention Tl can be used as other nanometers order metal particles with which the effect of shortening the response time can be acquired. A sample S2a of a vertically-oriented type liquid crystal display element wherein 0.1 wt % of nanometers order Tl particles had been added to the vertically-oriented type liquid crystals M4 was made. Manufacturing method and measuring method of the vertically-oriented type liquid crystal display element are the same as in the second embodiment.

Figures 9, 10:
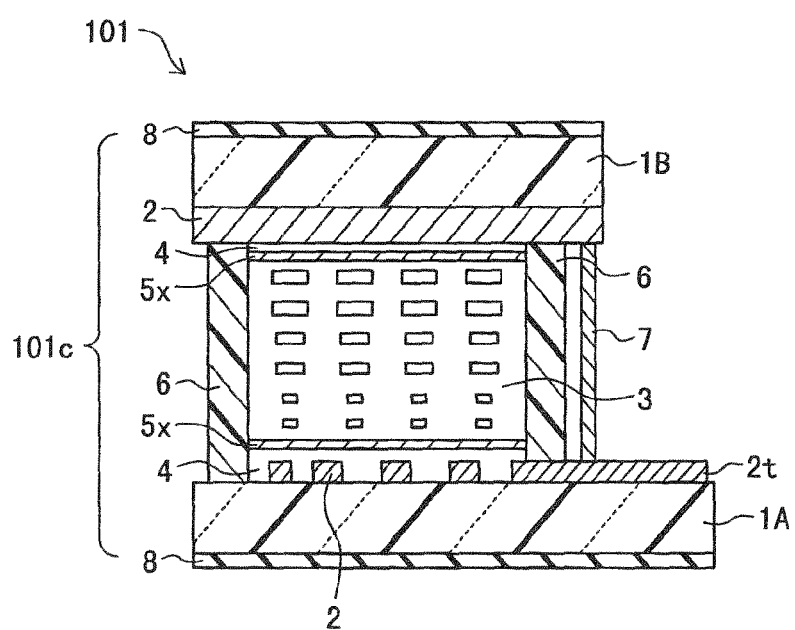
FIG. 9 is a table of response times of a sample S2a of the liquid crystal display element according to a modified example of the second embodiment at −30 degrees Celsius.
FIG. 10 is a cross sectional view of a liquid crystal display element according to a third embodiment of the present invention.

FIG. 9 shows response times of the sample S2a at −30 degrees Celsius. The response times are shortened at least about 10% by irradiating the near infrared rays. The response times after irradiating the near infrared rays for more than one minute are almost same as the response time after irradiating the near infrared rays for one minute; therefore, the sufficient irradiation time is about one minute.

As further example of the nanometers order metal particles with which the effect of shortening the response time, rare earth elements (Sc, Y) and transition metals (Ni, etc.) can be mentioned. Those nanometers order metal particles have good solubility in liquid crystals.

The dose amount of the nanometers order metal particles in the above-described embodiments were 0.1 wt % to 0.5wt %. Because the effect of shortening the response time is sufficiently acquired with the dose amount of 0.1 wt %. it is considered that the minimum dose amount is about 0.02 wt %. Moreover, if the dose amount is too much, the property of the liquid crystals may change; therefore, it is considered that the maximum dose amount will be 1.0 wt %.

It is preferable to select a size of the nanometers order metal particles from a range of 1 nm to 100 nm. If the size is 1 nm or smaller, the effect of absorbing the near infrared rays is considered to be insufficient. Moreover, if the size is 100 nm or larger, it is considered that the stable dispersion into the liquid crystals in a long term is difficult.

As described in the embodiments, a response time of a liquid crystal display element can be shortened by at least 8% by irradiating near infrared rays having wavelength of 3 μm or shorter to a liquid crystal layer of which liquid crystals have been added with the nanometers order metal particles.

The embodiments wherein the nanometers order metal particles are added to the liquid crystal layer have been explained. It is also possible to add material having an absorption band in a near infrared range to a film near a liquid crystal layer, e.g., an oriented film.

(Third Embodiment)

FIG. 10 shows a twisted nematic (TN) liquid crystal display element 101 according to the third embodiment of the present invention. Differences from the STN liquid crystal cell according to the first embodiment will be mainly described.

The glass substrates 1A and 1B, the ITO electrode patterns 2, the output wiring 2t and the insulating films 4 are similar to those in the liquid crystal cell shown in FIG. 2.

In case of the TN-LCD, a pre-tilt angle is preferably low (at two degrees or lower toward a substrate plane). As material for a horizontally-oriented film, SE-410, which can be obtained from Nissan Chemical Industries, LTD., is used. Liquid horizontally-oriented film forming material is added with 5 wt % of the near infrared absorption material by mixing. Details of the near infrared absorption material will be described later. The horizontally-oriented films 5x are formed on the insulating films 4 by spin coat in an almost same pattern as the insulating films 4. For example, the spin coat is performed at spinner rotation number of 2000 rpm for 30 seconds to form the horizontally-oriented films 5x having thickness of about 700 Å. Furthermore, the horizontally-oriented films 5x may be formed by the flexo printing, inkjet printing, etc.

The rubbing process is performed to the horizontally-oriented films 5x. The rubbing process is a process in which the horizontally-oriented films 5x are rubbed by rapidly rolling a cylinder rolled with cloth. The process is performed to set a twist angle of liquid crystals 3 between the upper and the lower substrates to 90 degrees (left hand rotation).

The formation of the sealing material 6, the formation of the conducting material 7, the dispersion of the gap control material, the formation of the vacant cells, the filling of the liquid crystals and the sealing process are the same as in the first embodiment. A liquid crystal display element 101 is formed by placing the polarizing filters 8 aligned in the paralleled or crossed Nicols on the outside surfaces of the upper and the lower glass substrates.

A sample S3A of the liquid crystal cell of which oriented films had been added with benzodifuranone compound (hereinafter called the material A) as the near infrared absorption material and a sample S3B of the liquid crystal cell of which oriented films had been added with polyaniline (hereinafter called the material B) as the near infrared absorption material were manufactured. Moreover, as a comparative sample, a sample SC3 of the liquid crystal cell of which oriented films had been added with no near infrared absorption material was made. The polarizing films are not provided in the state of the liquid crystal cells.

Transmission spectrums of the sample S3A, S3B and SC3 of the liquid crystal cells 101c were measured by the measurement system shown in FIG. 3A.

Figure 11:
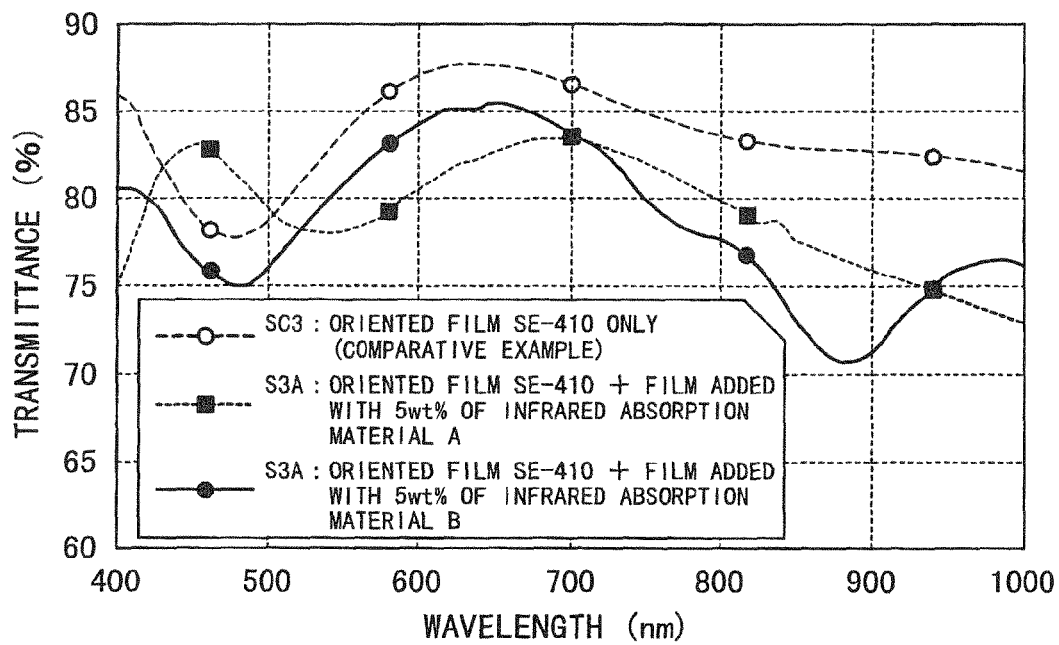
FIG. 11 is a graph showing transmission spectrums of samples S3A and S3B of a liquid crystal cell according to the third embodiment with comparison to a transmission spectrum of a sample SC3 of a comparative example.

FIG. 11 shows the transmission spectrum from the visible range to the near infrared range of each sample. The transmittances of the samples S3A and S3B of the liquid crystal cells in the near infrared range are lower than the transmittance of the comparative sample SC3 in the near infrared range. It is understood that the materials A and B absorb the light in the near infrared range.

The polarizing filters 8 are bonded to each sample of the liquid crystal cell in paralleled Nicols to manufacture each one of samples S3A, S3B and SC3 of TN mode liquid crystal display elements 101. Voltage-transmittance properties at a low temperature (−30 degrees Celsius) of the manufactured samples S3A. S3B and SC3 were measured by using the measurement system shown in FIG. 3B.

Figure 12:
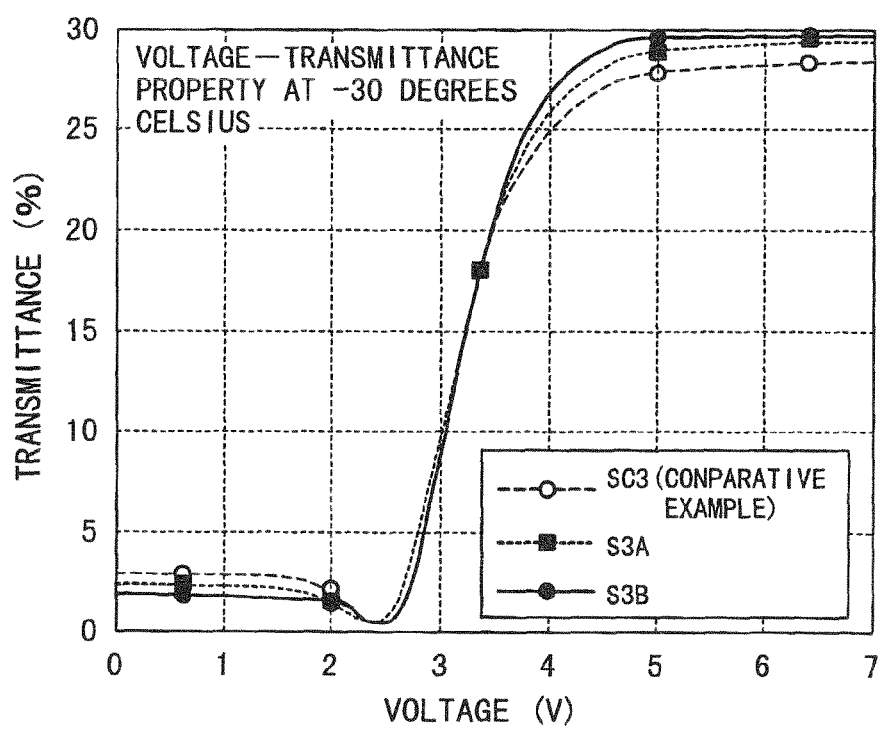
FIG. 12 is a graph showing voltage-transmission spectrums of the samples S3A, S3B and SC3.

FIG. 12 shows voltage-transmittance properties. There were no significant difference found between the voltage-transmittance properties of the samples S3A and S3B of the liquid crystal display element of which oriented films are added with the near infrared absorption material and the voltage transmittance property of the comparative sample SC3 of the liquid crystal display element.

Optimized voltage that can acquire the maximum contrast is obtained Tom the measured voltage-transmittance properties. The near infrared rays were irradiated to the liquid crystal layers of the liquid crystal display elements 101 from their back sides, and the response properties were measured at a low temperature (−30 degrees Celsius) under condition of ¼ duty drive at the optimized voltage. The measurements of the responses were performed before the irradiation of the near infrared rays (irradiation time "0") and a minute, two minutes, three minutes, four minutes and ten minutes after the irradiation.

Figure 13:
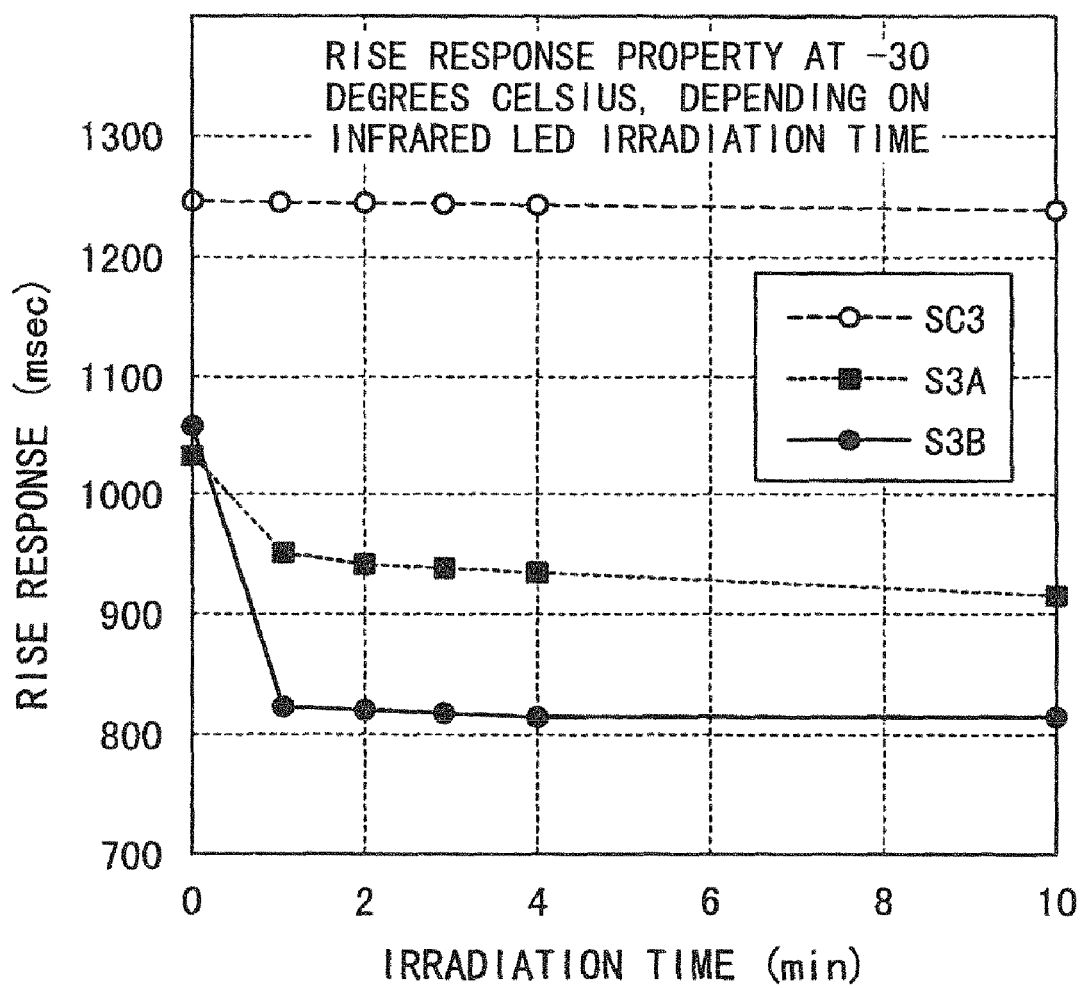
FIG. 13 is a graph showing response properties of the samples S3A, S3B and SC3.

FIG. 13 shows a response property of each sample. The vertical axis shows a rise time (msec), and a horizontal axis shows an irradiating time (minute) of the near infrared rays LED, the responses of the samples S3A and S3B are faster than the response of the comparative sample SC3, that is, the samples S3A and S3B have a shorter rise time than the comparative sample SC3 does. The response time of the samples S3A and S3B rapidly becomes shortened in about one minutes from the starting irradiation of the near infrared rays and thereafter saturated; therefore, it can be said that the response time is shortened rapidly after starting up the liquid crystal display element.

It can be considered that the response time of the liquid crystals was shortened by adding the near infrared rays absorption material to the oriented films because the near infrared rays absorption material in the oriented films absorbed the near infrared rays, and energy of the absorbed near infrared rays turned into thermal energy to heat the liquid crystal layer contacted with the oriented films.

(Other Examples of the Near Infrared Rays Absorption Material)

Moreover, the material A has high solubility to organic solvent, and the material B has high heat resistance (about 300 degrees Celsius). Material which has similar characteristics as the material A and the material B can be used as the near infrared absorption material.

As the near infrared absorption material, a benzodifuranone compound, polyaniline, a cyanine group pigment, a polymethin group pigment, a phthalocyanine pigment, an aminium pigment, a diimmonium pigment a nickel dithiolene compound, an azido compound, an immonium group pigment a diimmomium group pigment, a triallyl methane group pigment, a naphthoquinone group pigment, an anthraquinone group pigment, a squarylium group pigment, a phtlialocyanine group pigment, a naphthalocyanine group pigment, and a nickel dithiolene complex can be used.

Figure 14:
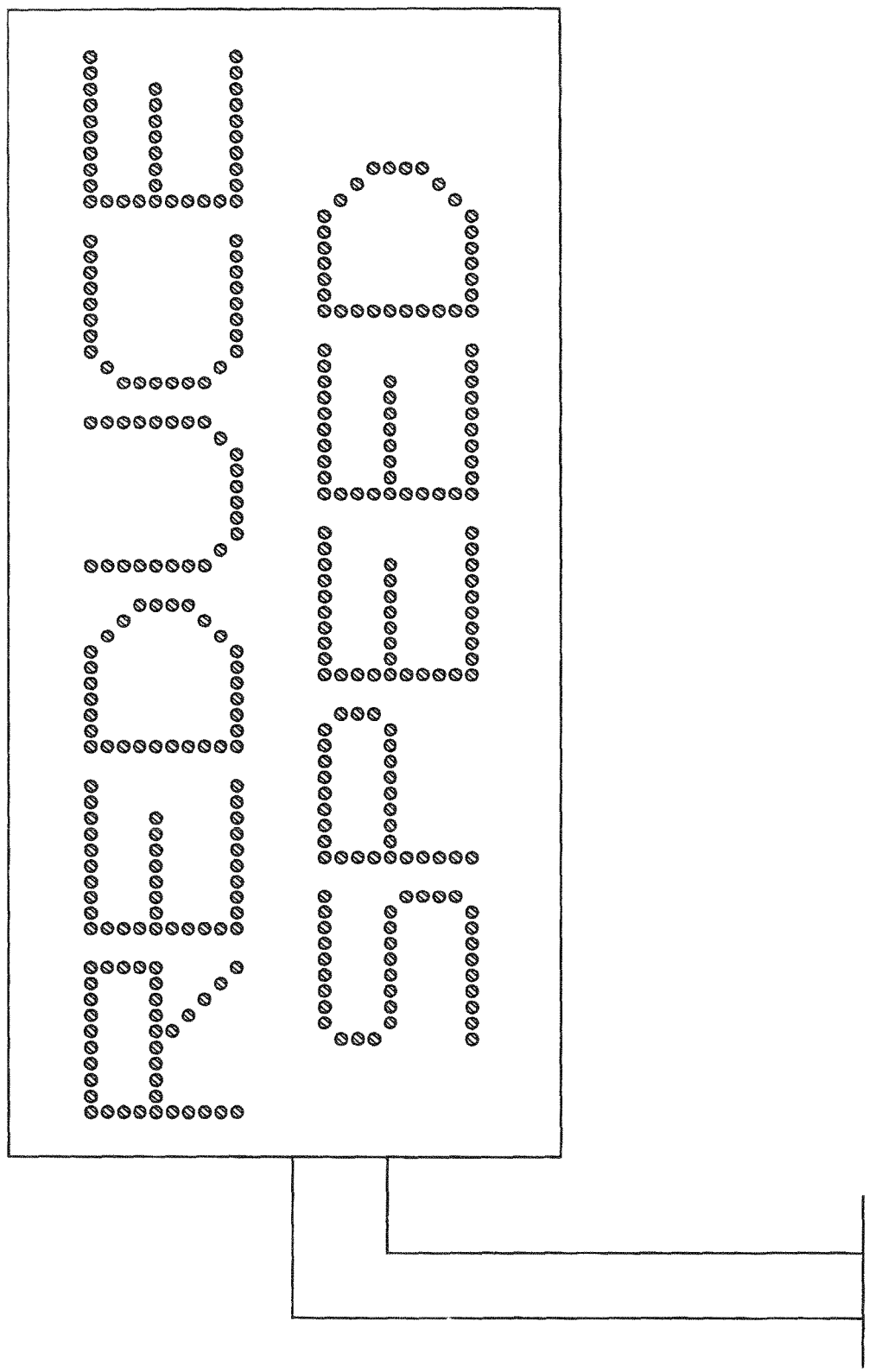
FIG. 14 is a front view of an outdoor display board equipped with a liquid crystal display device.

FIG. 14 shows an outdoor display board equipped with a liquid crystal display device, which can be considered as an applied example. It is necessary for the outdoor display board to display rapidly in a condition at a low temperature. For example, in case of desiring to display an alert such as "REDUCE SPEED" for alerting a driver who drives beyond the speed limit after detecting its speeding by a sensor, there is possibility that the car has past thorough before displaying the alert if the response time of the liquid crystal is slow. It will be possible to keep a display function in a good condition in a cold district by shortening the response time of the liquid crystals (by making an operation speed of the liquid crystal display device faster).

When a voltage impressed to the liquid crystal display element 101 is turned off at a low temperature, the liquid crystal layer will not cooled down if the infrared LED is turned on, so that the liquid crystal display element 101 will be able to rapidly response upon input of a display signal.

Although the near infrared ray absorption material is added to the oriented films, a film to be added with the near infrared ray absorption material is not limited to the oriented film. The near infrared ray absorption material may be added to the insulating films 4, which are base films of the oriented films 5. Base films to which the near infrared ray absorption material is added may be formed as base films of the oriented films other than the oriented films and the insulating films.

In the third embodiment the TN type liquid crystal display element has been explained. The embodiment can be adopted to other types of liquid crystal display element such as a super (S) TN type a vertically-oriented type, an in-plane switching (IPS) type, an optical compensated bend (OCB) type, a polymer network (PN) type, a guest host (GH) type. etc.

Moreover, the near infrared ray absorption material can be added to films near the liquid crystal layer as in the first and the second embodiment in addition to the films near the liquid crystal layer as in the third embodiment.

The present invention has been described in connection with the preferred embodiments. The invention is not limited only to the above embodiments.

Figure 15A:
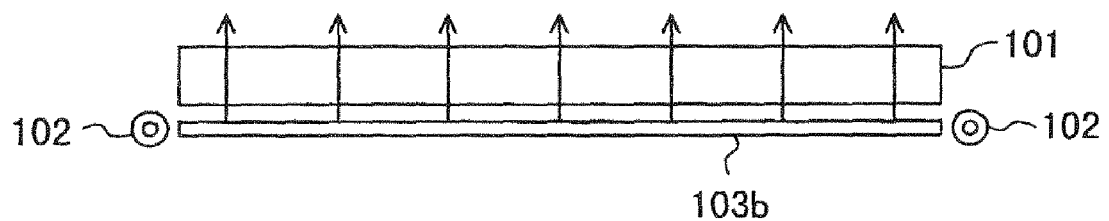
FIG. 15A and FIG. 15B are side views showing examples of light units.
Figure 15B:
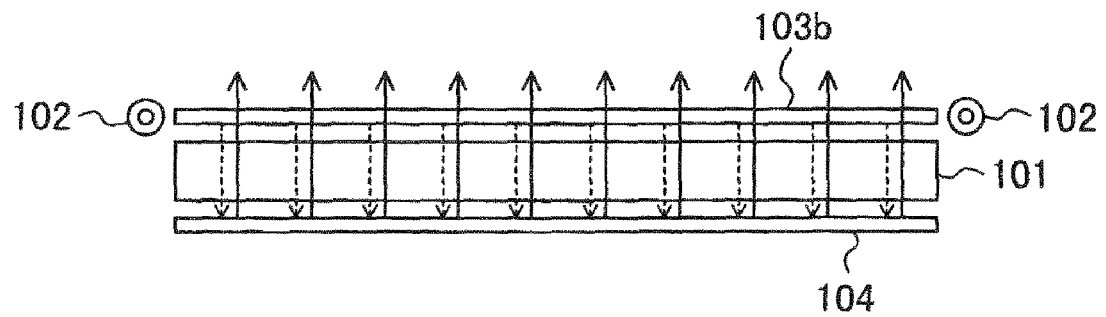

FIG. 15A and FIG. 15B show other examples of the light unit 102. In the example shown in FIG. 15A, a light emitted by a side light unit having both cold cathode fluorescent lamp and infrared light source is taken in from a side of a light guiding plate 103b to the liquid crystal display element 101.

In the example shown in FIG. 15B, the light unit 102 is place in from of the liquid crystal display element 101, a light emitted by a side light unit having both cold cathode fluorescent lamp and infrared light source is taken via a light guiding plate 103b to the liquid crystal display element 101, and the light reflected by a reflection plate 104 placed in the back of the liquid crystal display element 101 is emitted through the liquid crystal display element 101 again (i.e., a front light unit). Normally, a reflective mode liquid crystal display device does not have a backlight such as an incandescent lamp; therefore, the liquid crystal layer is not heated. However, by equipping the light unit with the infrared ray light source as in the examples, the liquid crystal layer can be heated by the infrared rays. It can be heated with low power consumption and response property can be kept.

The liquid crystals may be filled by vacuum filling or one drop filling (ODF). In case of using the vacuum filling, only one filling point is necessary. In case of using the ODF, a filling point is not necessary, and the one drop filling is performed before bonding the upper and the lower substrates.

Reduction in thermal efficiency due to absorption by the polarizing filters can be restrained by using a polarizing splitter to make the light from the infrared light source a polarized light in parallel to a transmission axis of the polarizing filter. Moreover, it is apparent that various modifications improvements, combinations, and the like can be made by those skilled in the art.

DRAWINGS

FIG. 4 TRANSMITTANCE (%), WAVELENGTH (nm), S1: LC4 ONLY, SC1: LC4+Au (0.5 wt %)

FIGS. 5A. 5B, 8, 9 IRRADIATION TIME [minutes], RESPONSE TIME [msec]

FIG. 7 TRANSMITTANCE (%), WAVELENGTH (nm), SC2: M4, S2: Ag/Pd NANO PARTICLES (0.1 wt %)

FIG. 11 TRANSMITTANCE (%), WAVELENGTH (nm) SC3: ORIENTED FILM SE-410 ONLY (COMPARATIVE EXAMPLE), S3A: ORIENTED FILM SE-410+FILM ADDED WITH 5 wt % OF INFRARED ABSORPTION MATERIAL A, S3B: ORIENTED FILM SE-410+FILM ADDED WITH 5 wt % OF INFRARED ABSORPTION MATERIAL B

FIG. 12 VOLTAGE-TRANSMITTANCE PROPERTY AT −30 DEGREES CELSIUS, SC3 (COMPARATIVE EXAMPLE), TRANSMITTANCE (%), VOLTAGE (V)

FIG. 13 RISE RESPONSE PROPERTY AT −30 DEGREES CELSIUS, DEPENDING ON INFRARED LED IRRADIATION TIME, SC3 (COMPARATIVE EXAMPLE), RISE RESPONSE [msec], IRRADIATION TIME [minutes]

FIG. 14 REDUCE SPEED

What are claimed are:

1. A liquid crystal display device, comprising:
a liquid crystal display element comprising (i) a pair of glass substrates facing each other, (ii) transparent electrode patterns, each transparent electrode pattern being formed on a facing surface of a respective one of said pair of glass substrates, (iii) film structures, each film structure including an oriented film and being formed on a respective one of said pair of glass substrates covering said transparent electrode on the respective one of said pair of glass substrates, and (iv) a liquid crystal layer held between the pair of glass substrates; and a light source adapted to radiate near infrared rays to said liquid crystal display element, wherein said liquid crystal layer includes rod-shaped Au particles of nanometer order which are dispersed in said liquid crystal layer and enhance absorption of near infrared rays by said liquid crystal layer; and wherein 0.02 wt % to 1.0 wt % of said Au particles of nanometer order are added to liquid crystals mainly composing said liquid crystal layer, and heat said liquid crystal layer by absorbing the near infrared rays radiated from said light source so as to improve a response speed of the liquid crystal display at a low temperature.

2. The liquid crystal display device according to claim 1, wherein said film structures include a near infrared ray absorption material which enhances absorption of near infrared rays by said film structures.

3. The liquid crystal display device according to claim 2, wherein said film structures including said near infrared ray absorption material comprise oriented films formed on both of said pair of glass substrates.

4. The liquid crystal display device according to claim 2, wherein said near infrared ray absorption material is one of a benzodifuranone compound, polyaniline, a cyanine group pigment, a polymethin group pigment, a phthalocyanine pigment, an aminium pigment, a diimmonium pigment, a nickel dithiolene compound, an azido compound, an immonium group pigment, a diimmomium group pigment, a triallyl methane group pigment, a naphthoquinone group pigment, an anthraquinone group pigment, a squarylium group pigment, a phthalocyanine group pigment, a naphthalocyanine group pigment, and a nickel dithiolene complex.

5. The liquid crystal display device according to claim 4, wherein said film structures including said near infrared ray absorption material comprise oriented films formed on both of said pair of glass substrates.

* * * * *